United States Patent [19]

Futch

[11] 4,086,911
[45] May 2, 1978

[54] SOLAR HEATING DEVICE

[76] Inventor: Wilbur O. Futch, P.O. Box 947, Brandon, Fla. 33511

[21] Appl. No.: 681,196

[22] Filed: Apr. 28, 1976

[51] Int. Cl.² .............................. F24J 3/02; F24H 7/00
[52] U.S. Cl. .................................... 126/271; 126/270; 237/1 A
[58] Field of Search .................. 126/270, 271, 400; 237/1 A; 165/59, 60, DIG. 2; 122/20 B

[56] References Cited

U.S. PATENT DOCUMENTS

| | | | |
|---|---|---|---|
| 1,747,826 | 2/1930 | Gould | 126/271 |
| 1,969,187 | 8/1934 | Schutt | 165/2 |
| 2,167,576 | 7/1939 | Kiser | 126/271 |
| 2,213,894 | 9/1940 | Barry | 126/271 |
| 3,107,052 | 10/1963 | Garrison | 237/1 A |
| 3,250,269 | 5/1966 | Sherock | 237/1 A X |
| 3,902,474 | 9/1975 | Pyle | 126/271 X |
| 3,929,122 | 12/1975 | Alkasab | 126/271 |

*Primary Examiner*—Kenneth W. Sprague
*Assistant Examiner*—Larry Jones
*Attorney, Agent, or Firm*—Stein & Frijouf

[57] ABSTRACT

A solar heating system is disclosed of the type used to heat hot water or like fluid for domestic or industrial use comprising a collector assembly including fluid storage facilities formed on the interior thereof and exterior portion surrounding the fluid storage facilities. A collector unit including a coil element wound continuously about the exterior portion and disposed to define part or all of the exposed surface of the exterior portion wherein this exterior portion further is arranged at an angular orientation between a base and head segment of the collector assembly. A transparent or light permeable casing surrounds the entire collector assembly wherein the entire collector assembly is connected in fluid communicating relation with a preheater assembly which includes a fan and is preferably mounted in an attic or other environment wherein the surrounding temperature is greater than ambient temperature.

7 Claims, 4 Drawing Figures

U.S. Patent  May 2, 1978  4,086,911
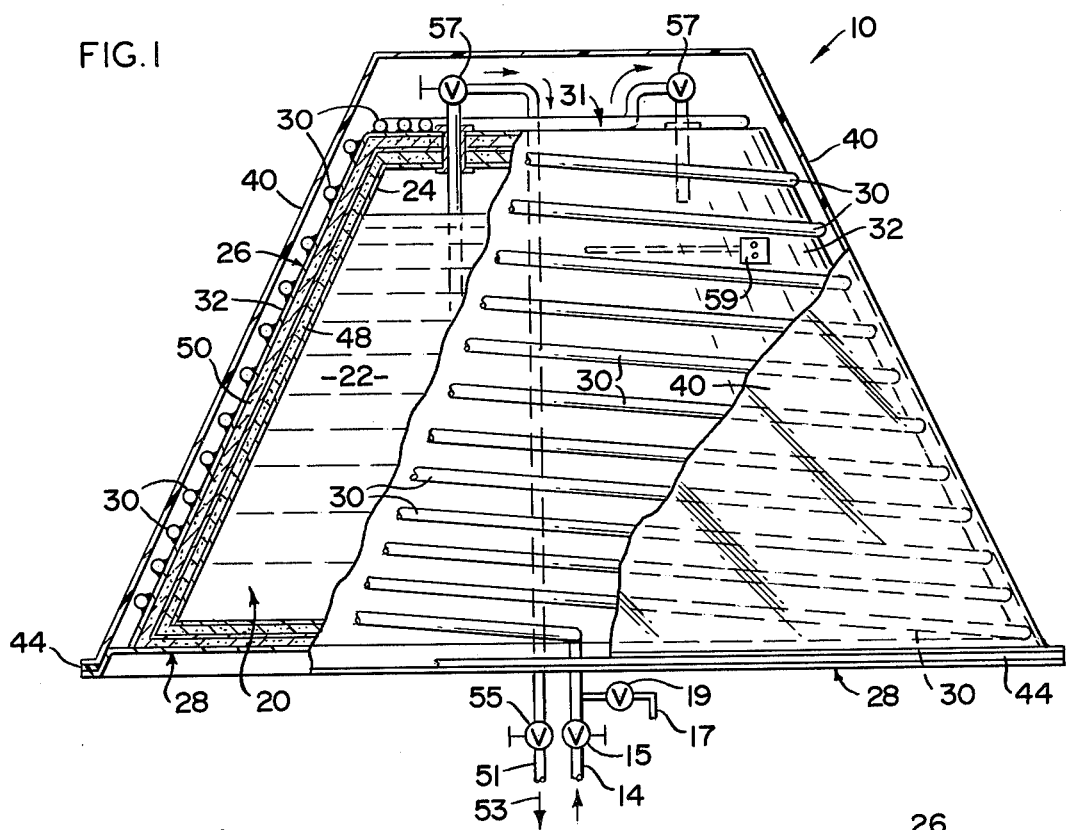
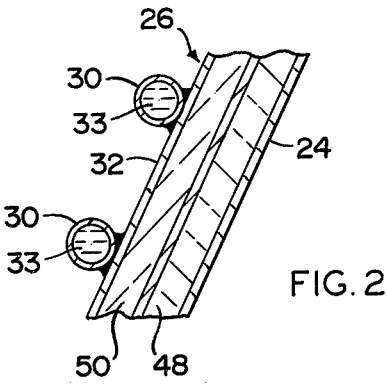
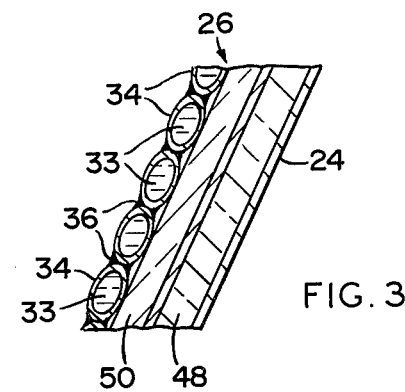
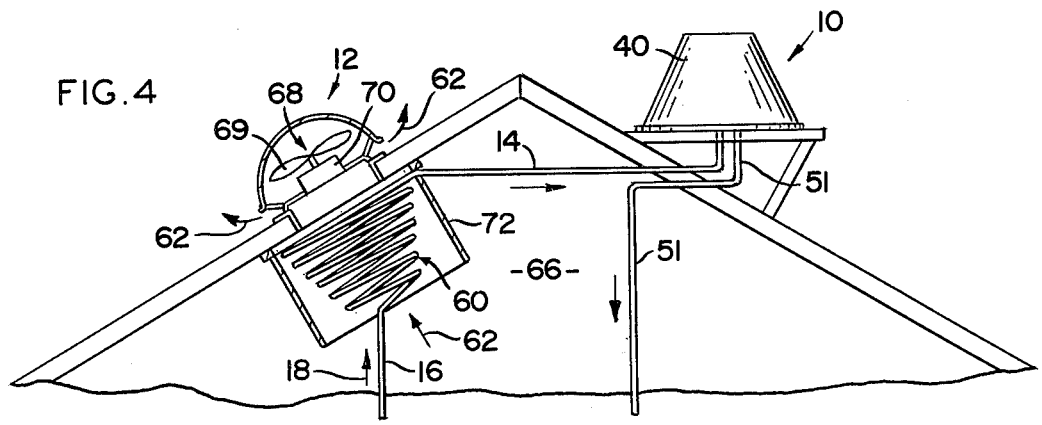

SOLAR HEATING DEVICE

BACKGROUND OF THE INVENTION

1. Field of the Invention

This invention relates to a solar water heater of the type designed to be mounted on the roof or adjacent an attic portion of the building such that a preheater assembly in the form of a supplementary collecting coil can be disposed in direct air flow from the attic or like room which would normally maintain a temperature greater than ambient. The preheater assembly is connected in fluid communication with the main solar energy collector assembly which has a fluid storage facility mounted on the interior thereof, the collector assembly being specifically shaped to obtain optimum exposure to the sun's radiation based upon its predetermined positioning.

2. Description of the Prior Art

Solar heating systems have long been known as a method of obtaining hot water or other fluids without the use of traditional fuels. Generally, such heating systems have been utilized for the purpose of attempting to reduce or eliminate heating cost by eliminating the need or at least lessen the demand for such traditional fuels. Numerous prior art systems have been utilized in industry and are also now commercially available.

However, even though solar heating systems have been known and been in practice for some time, there are recognized inherent disadvantages found in these prior art systems. Many of these known devices are generally not self-contained and fluid flow through the entire system is primarily dependent upon line pressure of the fluid to force the fluid through the coils of the heat exchanger. While such line pressure problems have been recognized, perhaps the greatest problems associated with the solar heating industry is efficiency of operation or performance capabilities. This problem of inefficiency is generally blamed on a number of structural features of the prior art system ranging from improper installation to inefficient heat collecting plates, etc. Generally, the basic structure of known solar heating systems includes some type of collector plate exposed to the direct rays of the sun wherein the collector plate comprises tubing through which water or liquid to be heated flows. Theoretically, the sun's energy is absorbed into the coils in the form of heat and transferred to the liquid. The liquid is then stored in a storage tank of normal conventional design. A number of the existing systems further cause forced circulation to occur at a constant or periodic basis dependent upon the temperature of the water desired and the difference in this temperature from the water being maintained in any storage tank or facility. While functional, this type of arrangement does not always result in maximum operating efficiency.

Another problem commonly present in the prior art and recognized in the heating industry is the existence of temperature sensors which are forced to be located in direct contact with the fluid flow in which therefore impair the flow of liquid through the coils. Temperature sensors are also utilized in prior art devices as a mechanical means to regulate the flow of fluid dependent upon the particular desired temperature or arrangement of temperatures intended for adequate operation of the system. While such temperature sensors are, of course, necessary and frequently utilized, overly complicated sensors are frequently considered to be unnecessary and at the same time unreliable and expensive to maintain and purchase.

All of the above problems which are adequately recognized in the solar heating industry can be summarized in the following categories (1) inefficiency of operation in heating the liquid or other fluid to the desired temerature or temperature range, (2) maintaining the liquid at the desired temperature and enabling heat transfer in a manner which is efficient, (3) consuming a relatively small amount of time and providing reliable operation even in inconsistent weather conditions.

Accordingly, there is a need in the water heating industry for a solar water heater of improved design and structure which operates effectively and efficiently to accomplish a desired purpose.

SUMMARY OF THE INVENTION

This invention relates to a fluid solar heating system primarily designed to be mounted on the exterior of a building structure adjacent the roof and/or attic portion. More specifically, the system comprises an energy collector assembly disposed in direct exposure to the sun's rays and energy. A preheater assembly is also provided in direct fluid communication with the energy collector assembly. A conventional source of liquid such as from the main water supply of a city or community is channeled first into the preheater assembly and then after being heated, as will be explained in greater detail hereinafter, is then transferred to the main or primary energy collector assembly which, as set forth above, is disposed in direct exposure to sunlight.

The primary or main energy collector assembly comprises a fluid storage means in the form of a tank having the heated liquid stored in the interior thereof. An external portion is disposed in surrounding relation to the storage means and includes a collector unit in the form of a coil defining at least a portion of the exterior of said storage means. The collector assembly comprises a head and a base portion disposed such that the exterior portion with the coils and the remainder of the unit is mounted thereon is substantially angular oriented to both the base and the head portion. This inclined orientation of the external portion substantially defines a frustoconical configuration of the collector assembly.

In one embodiment of the present invention the external or exposed surface of the energy collector assembly may have mounted thereon and accordingly defining a part thereof of the coil means itself. The coil is wrapped continuously around the external portion so as to accomplish maximum exposure to the sun's rays. The coil extends from an inlet point which is directly connected to the preheater assembly to the point where the heated water is dispensed directly into the storage means. In this embodiment the coil means is mounted on a collector plate made of heat conductive material so as to accomplish maximum heat transfer from the coil and collector plate to the fluid traveling or maintained within the coil means. For added efficiency both the external surface portion of the collector plate and the coil may be blackened so as to absorb maximum radiation.

In yet another embodiment of the present invention the coil means may be disposed in intimate contact with adjacently positioned portions so that the entire external surface is made up of the commonly engaging and continuously formed coils.

In this embodiment the exposed surface of the coils which, of course, defines the exposed surface of the external portion may be blackened to accomplish maximum efficiency.

Turning to the structure of the preheater assembly, a supplementary coil means which contains liquid passing directly from the conventional source of liquid or water is positioned in an attic or like area of the building structure which is normally maintained at a higher temperature due to the fact that heat naturally rises. An air directing means is disposed in air flow regulating position, immediately adjacent to the supplementary coil. This air directing means may take the form of a fan and may be positioned on either side of the coil, either upstream or downstream, so that it may establish air flow from the attic, over the supplementary coil and vent the directed, normally heated air to atmosphere. Heat therefore will naturally collect and be transferred to the liquid maintained or passing through the supplementary coil. It is therefore further obvious that the heat passing to the coil means associated with the energy collector assembly is preheated to the temperature of the air normally maintained in the attic or compartment where the preheater is located. Temperatures in the attics of the average domestic or industrial building reach amazingly high temperatures and substantial benefit is obtained in incorporating a solar collector assembly with such a preheater assembly as set forth above.

Other structural features of the present invention may comprise proper insulating means maintained between the collector plate and coil means and the storage facility itself so as to maintain efficient and effective heat transfer from the solar radiation collected by the energy collector assembly. To enhance this collection, a casing means, which may be correspondingly configured in a frustoconical configuration corresponding to the energy collector assembly is disposed in surrounding relationship thereto. This casing means is formed of a transparent material or a material capable of allowing the sun's radiation to pass therethrough.

In addition, proper valving is associated with the water inlets and outlets leading in the fluid path defined from the conventional source of fluid supply, through the preheater assembly and finally to and from the energy collector assembly exposed to the sun's radiation.

Other devices including a bleed vent or cock communicating with the coil means of the energy collector assembly may be provided. Similarly, a heat sensing means may be properly located on the collector plate and/or in direct contact with the water being stored in the storage means as described above.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a cross-sectional view in partial cutaway showing the interior and various exterior portions of the energy collector assembly of the present invention.

FIG. 2 is a, partial cutaway view in section of one embodiment of the coil means associated with the collector plate of the present invention.

FIG. 3 is a detail view in partial cutaway and section showing yet another embodiment of the present invention directed to the coil means.

FIG. 4 is a schematic view showing direction of fluid flow from a liquid supply, through a preheater assembly and finally to and from the energy collector assembly.

Similar reference characters refer to similar parts throughout the several views of the drawings.

DETAILED DESCRIPTION

With reference to FIG. 4 the fluid heating system includes an energy collector assembly generally indicated as 10 connected in fluid communication to a preheater assembly generally indicated as 12. Fluid interconnection between the energy collector assembly 10 and the preheater assembly 12 takes place by conventional conduit or piping 14. Similarly, piping 16 directs water or other liquid from a conventional fluid supply upwardly through conduit 16 into the preheater assembly as indicated by directional arrow 18.

With reference to FIG. 1 the energy collector assembly 10 comprises fluid storage means generally indicated as 20 including heated water or fluid 22 maintained in tank 24 which comprises a portion of the fluid storage means. The energy collector assembly 10 further comprises an external portion 26. The external portion comprises a continuous side wall extending at an angular orientation between a base portion 28 and a head portion 31. This angular inclination and continuous configuration define a frustoconical shape of the energy collector means as clearly represented in both FIGS. 1 and 2.

The external portion has a collector unit mounted thereon. This collector unit comprises coil means 30 and collector plate 32 which together define the external surface of the external portion of the energy collector assembly as shown in the embodiment of FIGS. 1 and 2. Both plate 32 and coil means 30 may be made from a copper or like heat conductive material wherein fluid 33 maintained or passing through coil means 30 has the heat transferred thereto. Such heat, as in conventional systems, is collected by the plate 32 and the coil means 30 and thereby transferred to the fluid 33.

In the embodiment shown in FIG. 3 the external surface is defined entirely by the plurality of coil means 34 disposed in intimate side-by-side engagement with one another as at junction 36. Irrespective of the embodiment utilized as shown in FIGS. 2 and 3 both the coil means 30 and/or 34 and the plate 32 may be blackened to effectively aid in the collecion of radiation in the form of heat. Irrespective of the embodiment shown in FIGS. 2 or 3 the coil means essentially forms a continuous path of fluid flow about the external surface of the external portion 26.

Another structural feature of the present invention comprises casing means 40 having a generally corresponding frustoconical configuration as the remainder of the energy collector assembly. The casing means 40 is formed from a transparent or like material permeable to the sun's radiation. Rubber sealing may be placed as at 44 to help seal the casing means about the energy collector assembly. The relationship between the casing and the collector assembly is such as to raise the temperature on the interior of the casing means thereby aiding in heat transfer to the liquid 33 within coil means 34.

In order to effect optimum or maximum heat transfer proper insulation means 48 and 50 is disposed between the outer wall tank element 24 and the backing plate 32.

Water inlet means occurs through conduit 14 and proper valving arrangements 15 as shown. Vent means and release valve 17 and 19 are supplied and/or interconnected in the manner shown in FIG. 1. Similarly, outlet conduit 51 travels through the storage means or tank 24 in the direction indicated by directional arrrow 53 and is regulated by proper valving assemblies 55. Similar flow regulating valve means 57 may be supplied as shown in FIG. 1 to help regulate the flow of liquid into and out of the storage means 20 comprising the storage tank 24. Adequate heat sensing means 59 may be mounted either on the external surface of the collector assembly as on plate 32 or may be disposed in direct fluid contact with the liquid 22 within the storage means.

As shown in FIG. 4 the preheater assembly comprises a supplementary coil 60 fed from conventional water supply through conduit 16. Air flow is represented by directional arrow 62 is caused to pass over the supplementary coil from the attic space 66 by the flow directional means 68 which may be in the form of a fan 69 operated by a conventional fan motor 70. Tunnel means 72 may be provided in substantially surrounding relation to the supplementary coil 60 so as to help regulate the flow of heated air from attic space 66 over the supplementary coil.

It will thus be seen that the objects set forth above, among those made apparent from the preceding description, are efficiently attained, and since certain changes may be made in carrying out the above method and article without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween. Now that the invention has been described,

What is claimed is:

1. A fluid heating system of the type utilizing solar energy as a heating source, said heating system comprising: an energy collecter assembly having a frustoconical configuration and including fluid storage means configured to have fluid stored on the interior thereof; said energy collector assembly further comprising an exterior portion, a collector unit mounted on said exterior portion in substantially segregated and insulated relation to said fluid storage means, said collector unit comprising coil means disposed on the exterior surface of said exterior portion and defining at least in part a substantially continuous path of fluid flow from a fluid supply to said fluid storage means, said collector unit being in at least partial surrounding relationship relative to said fluid storage means; said energy collector assembly including a base portion and a head portion, said exterior portion and said collector unit disposed thereon in angular orientation between said base portion and said head portion and at least partially defining a predetermined configuration, casing means substantially correspondingly configured to said exterior portion of said energy collector assembly disposed in at least partially surrounding relation to said energy collector assembly, said casing formed at least in part from light permeable material, whereby solar radiation passes through said casing means to impinge on said collector unit when exposed to ambient solar radiation.

2. A fluid heating system as in claim 1 wherein a collector plate means is mounted on said exterior portion and disposed in supported relation to said coil means thereon, said collector plate means being disposed in angular orientation between said base portion and said head portion.

3. A fluid heating system as in claim 2 wherein said coil means is mounted on said plate means in spaced relation to one another and defining the external surface of said exterior portion at least in part with said plate means.

4. A fluid heating system as in claim 1 wherein said coil means is disposed on said exterior portion in engagement with immediately adjacently disposed others of said coil means, a major portion of the external surface of said exterior portion defined by said commonly engaging coil means.

5. A fluid heating system as in claim 1 wherein said energy collector assembly comprises fluid inlet means interconnected between the fluid supply and said fluid storage means; fluid outlet means interconnected between said fluid storage means and a fluid defining point; valving means interconnected in fluid regulating relation with both said inlet and outlet means; said energy collector assembly comprising a sensing means interconnected between said collector unit and said valving means, whereby flow of fluid into said fluid storage means is regulated through regulation of said valving means by said heat sensing means.

6. A fluid heating system as in claim 1 further comprising a preheater assembly disposed in fluid communication between the fluid supply and said fluid storage means, said preheater assembly further comprising supplementary collector means, air flow directing means disposed adjacent said supplementary collector means, whereby said preheater assembly is disposed in air flow having a greater temperature than ambient.

7. A fluid heating system as in claim 1 wherein said air flow directing means comprises a fan disposed to establish air flow over said supplementary collector means.

* * * * *